United States Patent
Stephens et al.

(10) Patent No.: US 7,734,186 B2
(45) Date of Patent: Jun. 8, 2010

(54) SIGNAL TRANSMISSION IN AN OPTICAL SYSTEM

(75) Inventors: Marc Francis Charles Stephens, Leamington Spa (GB); Steven Alleston, Leamington Spa (GB); Nicholas John Doran, Stratford-on-Avon (GB)

(73) Assignee: Ericsson AB, Stockholm (SE)

( * ) Notice: Subject to any disclaimer, the term of this patent is extended or adjusted under 35 U.S.C. 154(b) by 662 days.

(21) Appl. No.: 10/490,039

(22) PCT Filed: Sep. 17, 2002

(86) PCT No.: PCT/GB02/04215

§ 371 (c)(1),
(2), (4) Date: Feb. 7, 2005

(87) PCT Pub. No.: WO03/026167

PCT Pub. Date: Mar. 27, 2003

(65) Prior Publication Data

US 2005/0128568 A1 Jun. 16, 2005

(30) Foreign Application Priority Data

Sep. 19, 2001 (GB) .................................. 0122623.2

(51) Int. Cl.
H04B 10/00 (2006.01)
(52) U.S. Cl. .................... 398/147; 398/159; 398/192
(58) Field of Classification Search ......... 398/158–160, 398/79, 147, 192
See application file for complete search history.

(56) References Cited

U.S. PATENT DOCUMENTS

| 5,410,624 | A | * | 4/1995 | Morkel | 385/24 |
| 5,546,210 | A | * | 8/1996 | Chraplyvy et al. | 398/79 |
| 5,589,969 | A | * | 12/1996 | Taga et al. | 398/91 |
| 5,959,750 | A | | 9/1999 | Eskildsen et al. | |
| 6,118,561 | A | * | 9/2000 | Maki | 398/1 |
| 6,118,563 | A | * | 9/2000 | Boskovic et al. | 398/1 |
| 6,275,314 | B1 | * | 8/2001 | Ishikawa et al. | 398/178 |
| 6,317,539 | B1 | * | 11/2001 | Loh et al. | 385/37 |
| 6,366,376 | B1 | * | 4/2002 | Miyata et al. | 398/79 |
| 6,545,780 | B1 | * | 4/2003 | Takachio et al. | 398/79 |
| 6,594,048 | B1 | * | 7/2003 | Song et al. | 398/81 |
| 6,597,842 | B2 | * | 7/2003 | Dent et al. | 385/39 |
| 6,614,586 | B2 | * | 9/2003 | Hayee et al. | 359/334 |
| 6,690,886 | B1 | * | 2/2004 | Guy | 398/81 |

(Continued)

FOREIGN PATENT DOCUMENTS

WO WO 99/66607 12/1999

*Primary Examiner*—Agustin Bello
(74) *Attorney, Agent, or Firm*—Kirschstein, et al.

(57) ABSTRACT

A method of reducing Raman tilt in a transmission apparatus capable of transmitting a plurality of signals, occupying contiguous channels in a transmission band, through a length of optical transmission cable which exhibits the Raman effect of transferring energy from the shorter wavelength signals at one end of the transmission band towards the longer wavelength signals at the other end of the transmission band, including the transmission of half the maximum number of signals at twice the normal channel frequency spacing at a higher-than-normal level and the transmission signals in selected ones, fewer than all, of the available channels at the normal channel spacing at a normal power level. As new channels are added at the lower frequency channel spacing, the powers of both neighboring channels are reduced to the normal power level.

8 Claims, 6 Drawing Sheets

U.S. PATENT DOCUMENTS

Figure 3A:
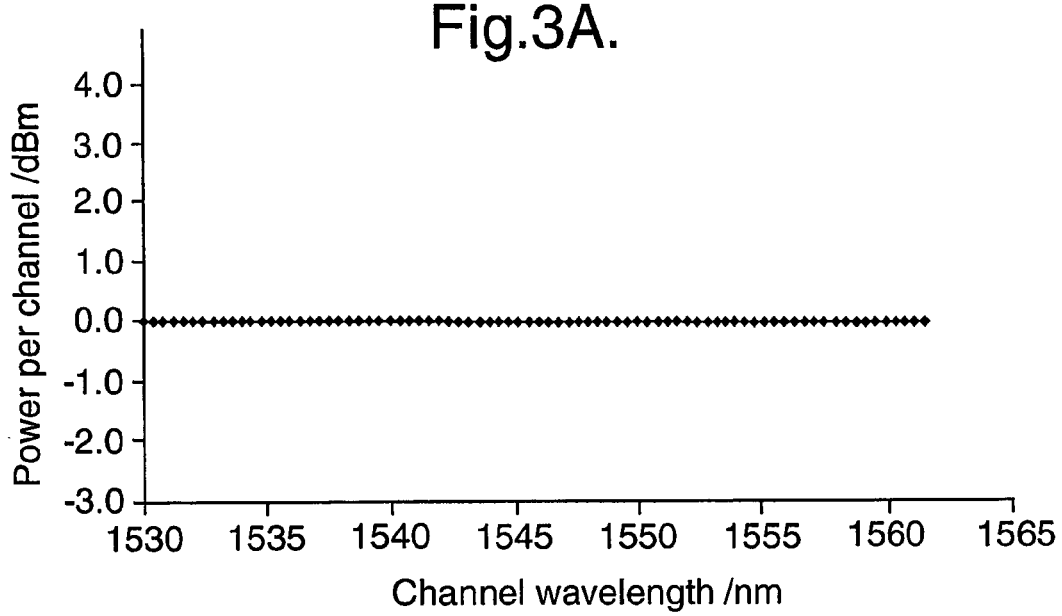

| | | | |
|---|---|---|---|
| 6,707,967 B2 * | 3/2004 | Rothenberg et al. | 385/37 |
| 6,738,580 B2 * | 5/2004 | Frignac et al. | 398/79 |
| 6,738,581 B2 * | 5/2004 | Handelman | 398/79 |
| 6,744,990 B1 * | 6/2004 | Suzuki et al. | 398/147 |
| 6,810,214 B2 * | 10/2004 | Chbat et al. | 398/160 |
| 6,930,824 B1 * | 8/2005 | Ishikawa et al. | 359/341.32 |
| 6,940,624 B1 * | 9/2005 | Sardesai | 398/79 |
| 7,003,226 B2 * | 2/2006 | Sakamoto et al. | 398/79 |
| 7,003,231 B2 * | 2/2006 | Way et al. | 398/186 |
| 7,149,256 B2 * | 12/2006 | Vrazel et al. | 375/295 |
| 2001/0024542 A1 * | 9/2001 | Aina et al. | 385/24 |
| 2004/0033013 A1 * | 2/2004 | Poti et al. | 385/24 |

* cited by examiner

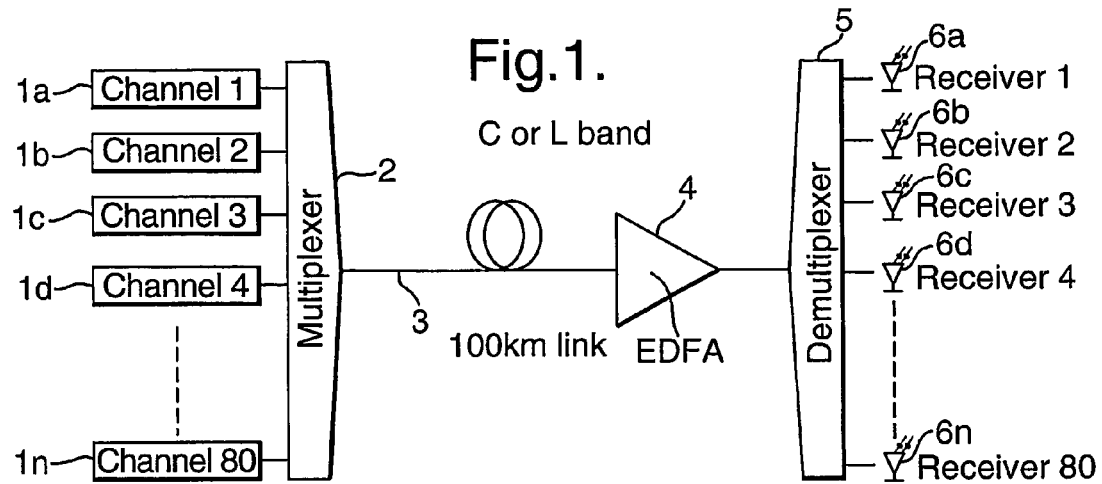
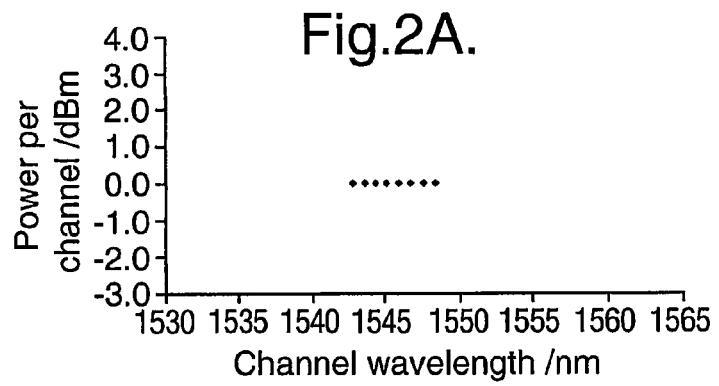
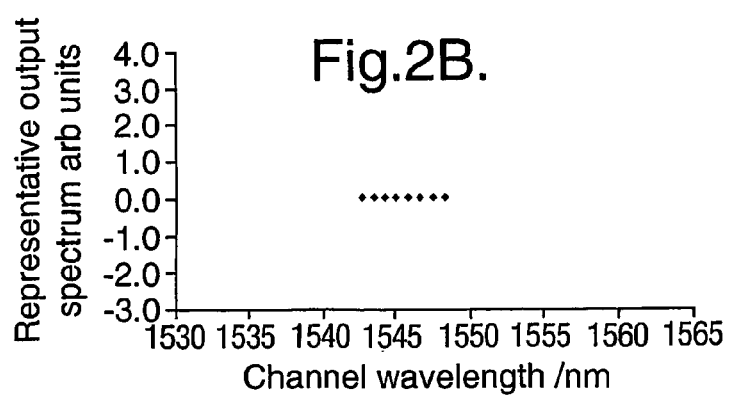

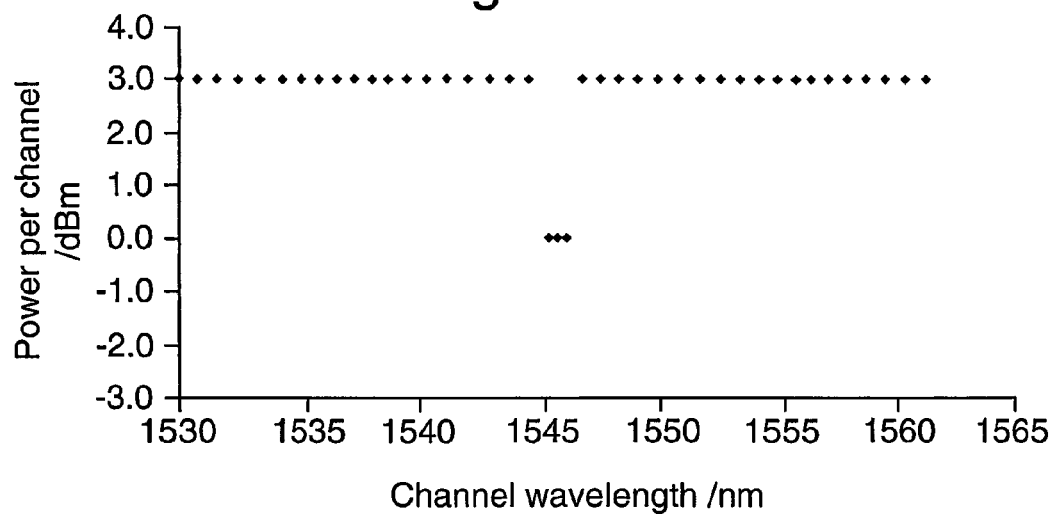
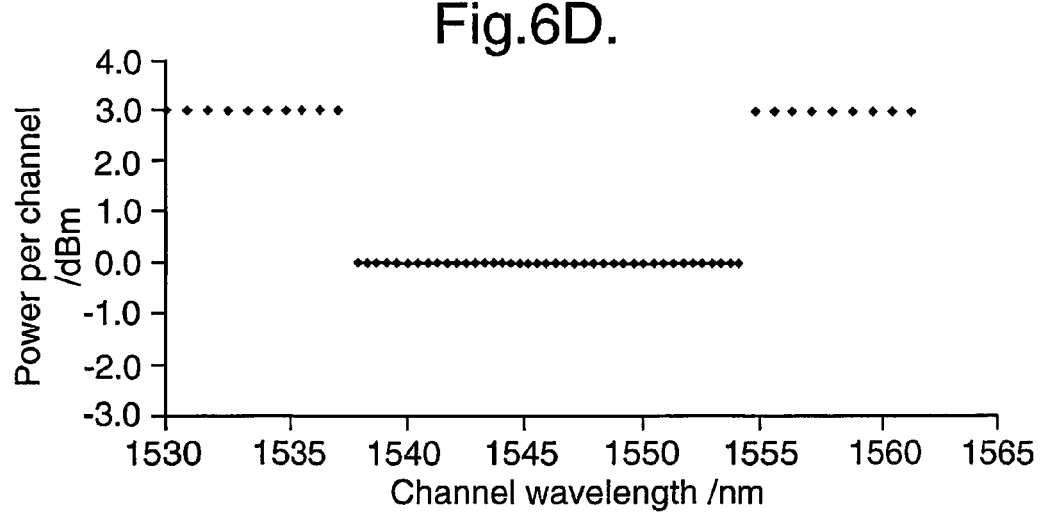

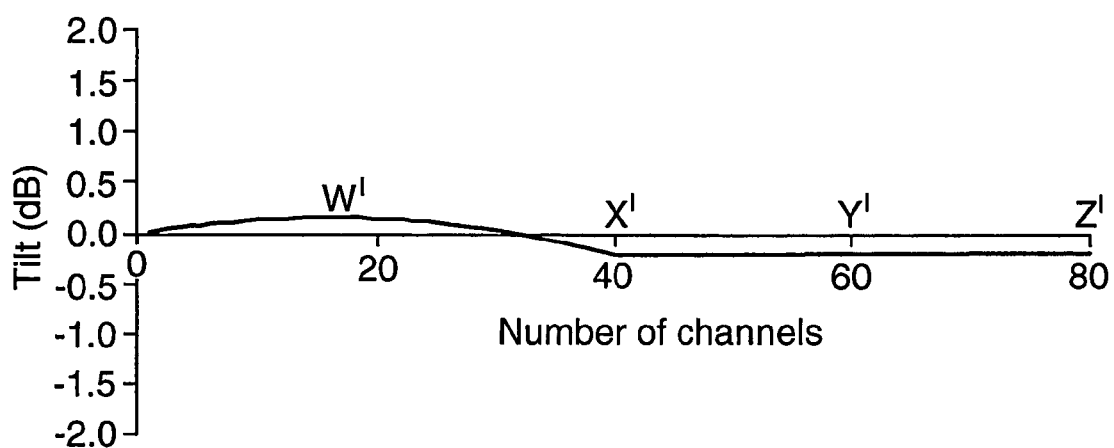

SIGNAL TRANSMISSION IN AN OPTICAL SYSTEM

The invention relates to a method of signal transmission by means of transmission apparatus capable of transmitting a plurality of signals, occupying contiguous channels in a transmission band, through a length of optical transmission cable which exhibits the Raman effect of transferring energy from the shorter wavelength signals at one end of the transmission band towards the longer wavelength signals at the other end of the transmission band.

The Raman effect is encountered in the transmission of wavelength division multiplexed (WDM) signals through lengths of optical fibre transmission cable at high optical intensities.

Wavelength division multiplexed systems operate with multiple wavelengths of light which are individually modulated with data, combined by multiplexing and transmitted through a length of optical fibre transmission cable. The combined signals are demultiplexed (that is, separated into the component wavelengths) at the destination and each wavelength is detected by means of a photodiode.

The invention provides a method of transmission by means of a transmission apparatus capable of transmitting a plurality of signals, occupying contiguous channels in a transmission band, through a length of optical transmission cable which exhibits the Raman effect of transferring energy from the shorter wavelength signals at one end of the transmission band towards the longer wavelength signals at the other end of the transmission band, including the steps of:

transmitting signals in a plurality of the available channels at more than the minimum channel spacing and at a higher power level than power level, the normal power level, at which signals are transmitted when all of the available channels are in use.

In one arrangement, signals are first transmitted in a plurality of alternate ones of the available channels at the higher power level.

In the one arrangement, the number of signals transmitted may be increased until signals are transmitted in alternate ones of all of the available channels at the higher power level.

Preferably, the higher power level is twice the normal power level.

Preferably, signals are transmitted with the minimum frequency spacing at the normal power level, the two neighbouring channels to subsequently transmitted signals being reduced in power to the normal power level.

Subsequent signals may be transmitted at the normal power level in the alternate channels between the channels in which signals are first transmitted, the adjacent channels to subsequently transmitted signals being reduced from the higher to the normal power level. Preferably, the method includes the step of amplifying the signals non-uniformly after they travel through the length of transmission cable, the amplification of the signals at the longer-wavelength end of the transmission band being lower than the amplification of the signals at the shorter-wavelength end of the transmission band.

In one arrangement, the method includes the step of amplifying the signals non-uniformly in an erbium-doped-fibre amplifier (EDFA).

The transmission band may be the C-band of the electromagnetic spectrum or, alternatively, the L-band of the electromagnetic spectrum.

In one arrangement, the normal power level is 1 milliwatt.

One form of the method includes the steps of:

(a) transmitting half the maximum number of channels on an equally spaced frequency grid (2X Hz) so as to fill the transmission band of interest in a contiguous manner, these channels being launched at twice normal operating power (2Pnom), which is sustainable due to the wide channel spacing of 2X Hz, (b) so transmitting subsequent channels on a shifted frequency grid, with respect to (a) above, that the frequency spacing between a new channel and an old channel is X Hz, the power of the new channel being $P_{nom}$ and the powers of the two neighbouring channels being reduced from 2 $P_{nom}$ to $P_{nom}$ in order to keep the total power transmitted constant.

The arrangement ensures that the Raman effect is kept constant from the point at which signals are transmitted at $P_{nom}$.

The step of amplifying the signals non-uniformly after they travel through the length of transmission cable, the amplification of the signals at the longer-wavelength end of the transmission band being lower than the amplification of the signals at the shorter-wavelength end of the transmission band, allows the Raman-induced gain tilt to be partially removed.

Figure 3B:
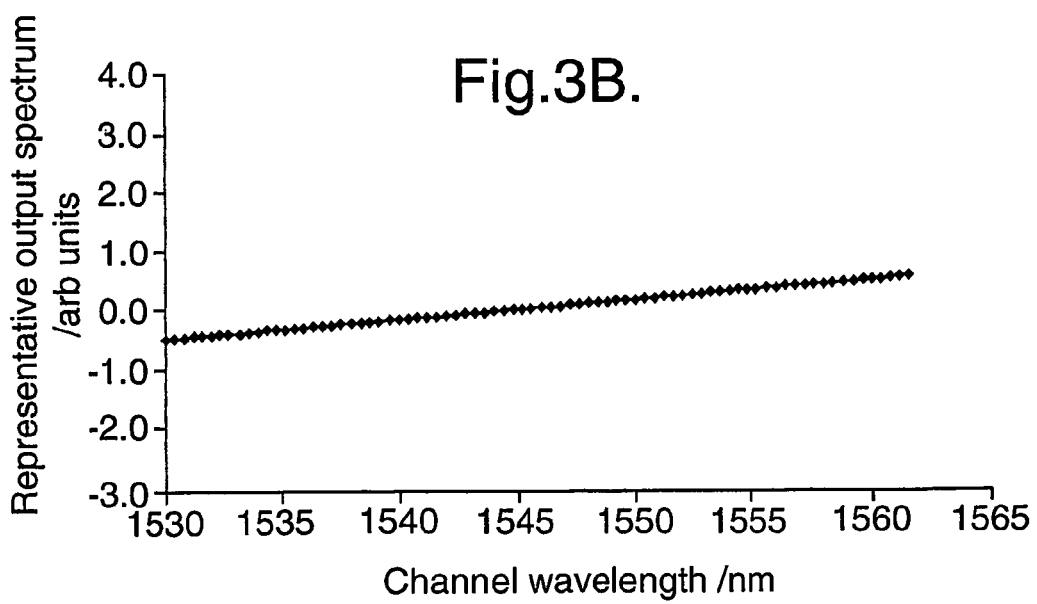
Figure 4:
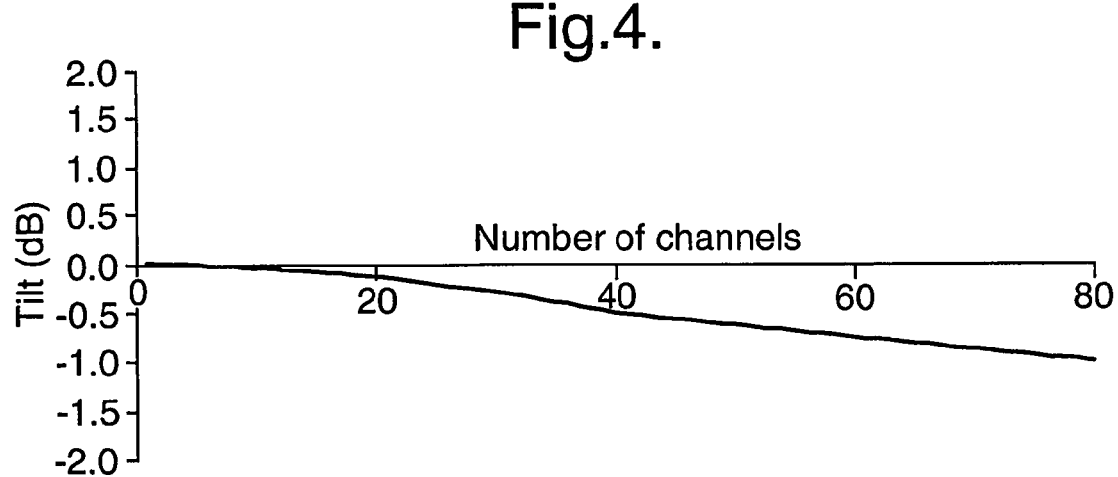
Figure 5:
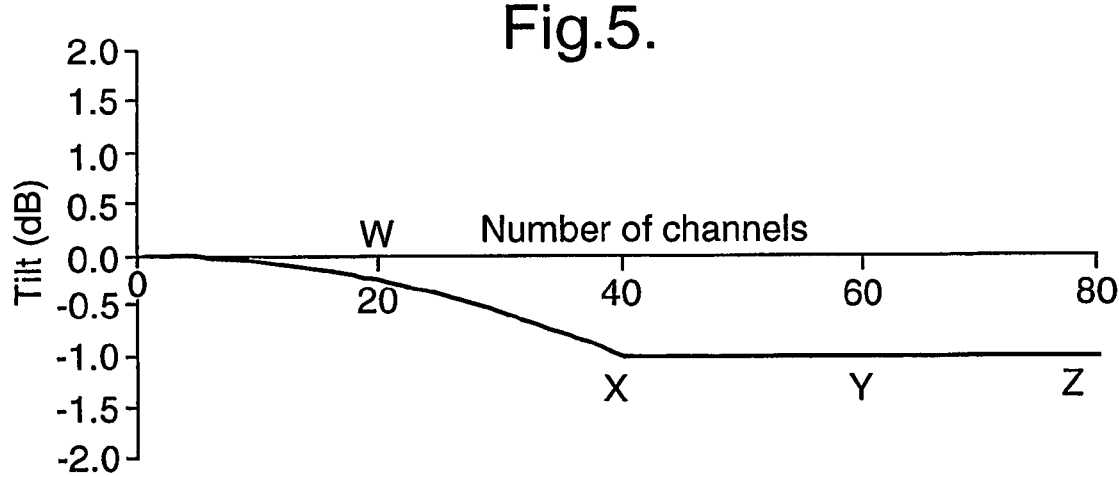
Figure 6A:
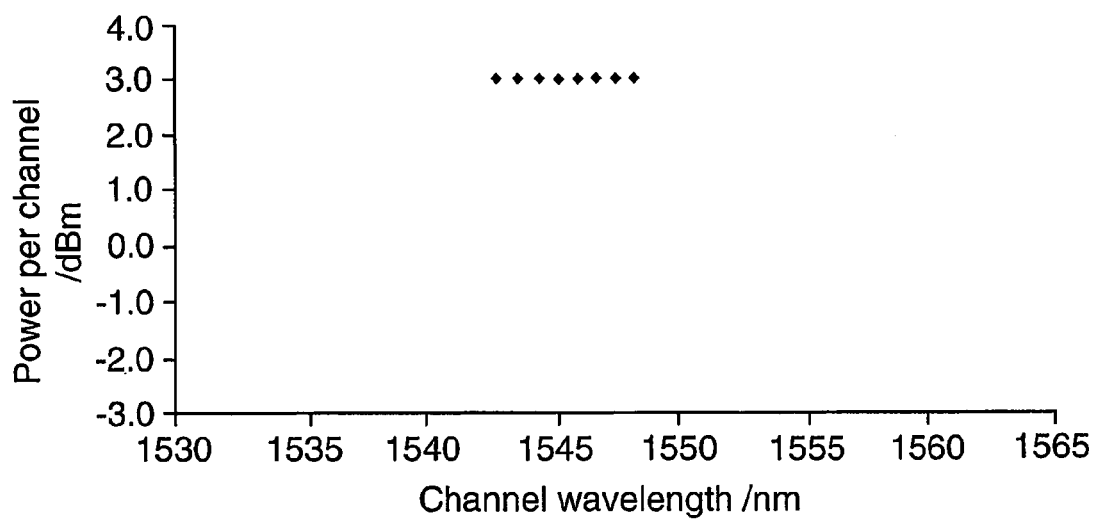
Figure 6B:
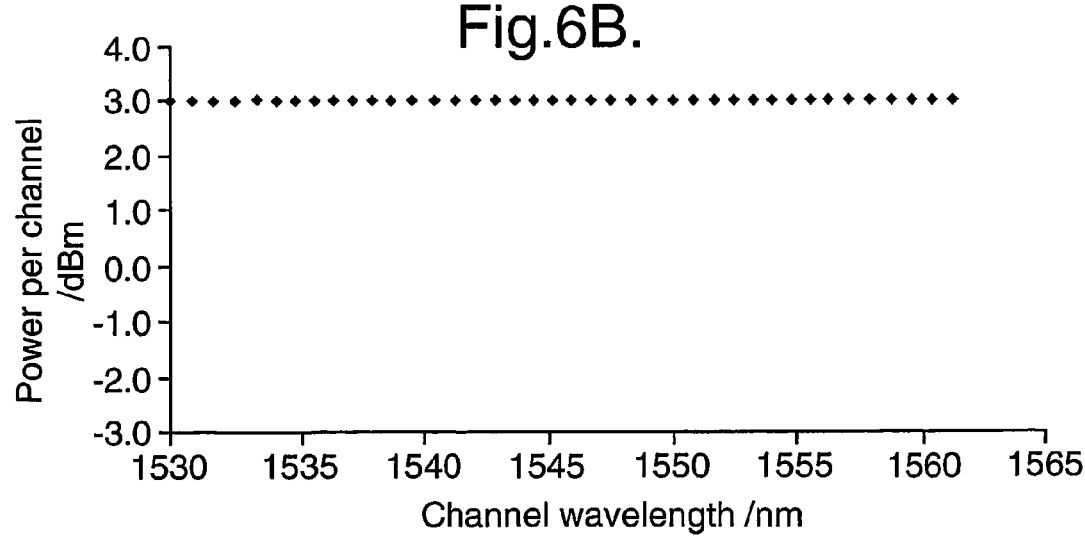

A method of transmission in accordance with the invention will now be described by way of example only with reference to the accompanying drawings, in which:

FIG. 1 is a diagrammatic representation of a link of a WDM optical transmission apparatus, operable in either the C-band or the L-band, suitable for the performance of the invention, FIG. 2A is a graphical representation of transmission on a contiguous 8 of the available channels of FIG. 1 at the normal power level, FIG. 2B is a graphical representation of the power levels of the received signals on the 8 channels used in FIG. 2A, FIG. 3A is a graphical representation of transmission on substantially all of the available channels of FIG. 1 at the normal power level, FIG. 3B is a graphical representation of the power levels of the received signals for the channels used in FIG. 3A, FIG. 4 is a graphical representation of inter-channel Raman tilt in the C-band for transmissions on 20, 40, 60 and all (80) available C-band channels in a C-band FIG. 1 apparatus, FIG. 5 is a graphical representation of the inter-channel Raman tilt in the C-band for transmissions on 20, 40, 60 and all (80) available C band channels, when the C-band FIG. 1 apparatus is operated in accordance with the invention, FIG. 6A is a graph showing the condition of 8 of the available 80 channels being transmitted at twice the minimum frequency spacing and twice the normal power level, in accordance with the invention, FIG. 6B is a graph showing the condition of 40 of the available 80 channels being transmitted at twice the minimum frequency spacing and twice the normal power, in accordance with the invention, FIG. 6C is a graph showing the condition of 41 of the available 80 channels being transmitted, 3 of the channels being transmitted at the minimum frequency spacing at normal power and the remainder being transmitted at twice the minimum frequency spacing and twice the normal power, in accordance with the invention, FIG. 6D is a graph showing the condition of 60 of the available channels being transmitted, 40 of the channels being transmitted at the minimum frequency spacing at normal power and the remainder being transmitted at twice the minimum frequency spacing and twice the normal power, in accordance with the invention and FIG. 7 is a graphical representation of the inter-channel Raman tilt in the C-band when non-linear amplification is employed in the method in accordance with the invention.

Referring to FIG. 1 of the accompanying drawings, a link of a WDM optical transmission apparatus includes a plurality of first transmitters 1a, 1b, 1c, 1d, . . . 1n connected to respective input ports of a multiplexer 2. The output port of the multiplexer 2 is connected to one end of a length of optical fibre transmission cable 3 and the other end of the length of optical fibre transmission cable 3 is connected to the input port of an optical amplifier 4. The output port of the optical amplifier 4 is connected to the input port of a demultiplexer 5. The output ports of the demultiplexer 5 are connected to respective optical receivers 6a, 6b, 6c, 6d . . . 6n.

The link of the WDM apparatus shown in FIG. 1 has, for example, a maximum capacity of 80 channels (1a, 1b, 1c, 1d, . . . 1n) in the C-band (1530 nm-1563 nm) of the electromagnetic spectrum at 50 GHz spacing. The length of the optical fibre transmission cable 3 (the link length) is of the order of 100 kilometers.

In the operation of the apparatus shown in FIG. 1, transmission may take place on all 80 channels in the C-band, the signals being combined in the multiplexer 2 and conveyed to the length of optical fibre transmission cable 3. The signals pass from the length of optical fibre transmission cable 3 to the demultiplexer 5 by way of the EDP amplifier 4. The demultiplexer 5 separates the 80 C-band channels. The separated channels are detected in the receivers 6a, 6b, 6c, 6d, . . . 6n.

Referring to FIG. 2A of the accompanying drawings, the figure shows, in effect, the transmission of 8 channels at the centre of the C-band at the same power level of 1 milliwatt (0 dBm) per channel.

Referring to FIG. 2B of the accompanying drawings, the figure shows, in effect, that the 8 channels transmitted at 1 milliwatt per channel as shown in FIG. 2A are received at a uniform power level.

Referring to FIG. 3A of the accompanying drawings, the figure shows the situation of all 80 C-band channels transmitted at the same power level of 1 milliwatt.

Referring to FIG. 3B of the accompanying drawings, the figure shows that the power levels of the received signals are altered in relation to the power levels of the transmitted signals, the signals at the shorter-wavelength end of the C-band being received at lower power levels than the signals at the longer-wavelength end of the C-band. The overall difference in power levels of the received signals is about 1 dB and the effect is called inter-channel Raman tilt.

Referring to FIG. 4 of the accompanying drawings, the figure shows that the overall inter-channel Raman tilt in the C-band is about 1 dB in the presence of transmissions on all 80 C-band channels.

Referring to FIG. 5 of the accompanying drawings, the figure shows the effect on received signals of transmission in accordance with the invention which includes the steps of:

(a) Transmitting alternate ones of channels 1 to 80, the odd-numbered channels 1 to 79, say, in a contiguous manner throughout the C-band at 2 mW (3 dBm) with 100 GHz spacing instead of the normal 1 mW with 50 GHz spacing until 40 channels are being transmitted. Such a scheme is illustrated for 8 channels in FIG. 6(a) and for 40 channels in FIG. 6(b). Non-linearity problems associated with high launch power do not occur because of the wider frequency channel spacing.

(b) Transmitting subsequent even-numbered channels 2 to 80 at the normal 1 mW (0 dBm), with 50 GHz spacing, by arranging that, for each channel added of the even-numbered channels 2-80, the neighbouring odd-numbered channels (50 GHz higher and 50 GHz lower) from channels 1-79 are reduced in power from 2 mW (3 dBm) to 1 mW (0 dBm). That is shown in FIG. 6(c) for 41 channels being transmitted and is shown in FIG. 6(d) for some 60 channels being transmitted. The total transmitted power in the fibre is kept constant for the transmission of between 40 and 80 channels.

Referring to FIG. 5, the inter-channel Raman tilt for transmissions in the C-band on 20 of the odd-numbered ones of channels 1 to 79 at 2 mW with 100 GHz spacing between transmitted channels is shown, there being about a 0.25 dB Raman tilt between the highest and lowest transmitted channels as indicated by the point labelled W in the figure. The addition of transmissions on 20 further channels with 100 GHz spacing results in a Raman tilt of about 1 dB between the highest and lowest transmitted channels as indicated by the point labelled X in the figure. The transmission of an additional 20 channels from the even-numbered channels 2 to 80 in the C-band at 1 mW with 50 GHz spacing (neighbouring odd-numbered channels reduced to 1 mW) results in substantially no change in Raman tilt as indicated by the point labelled Y in the figure. The further addition of transmissions on the remainder of the even-numbered channels at 1 mW with 50 GHz spacing (all odd-numbered channels reduced to 1 mW) results in the condition shown as Z in the figure of no additional Raman tilt.

It is evident from FIG. 5 that the Raman tilt remains relatively constant at 1 dB when between 40 and 80 channels are in use, as seen for the section X-Z of the curve, for transmission in accordance with the invention.

Referring to FIG. 7 of the accompanying drawings, the figure shows the effect of making the amplifier 4 shown in FIG. 1 a non-linear amplifier having a gain characteristic which decreases with wavelength over the band of interest, the C-band. As is shown in FIG. 7, the inter-channel Raman tilt, when a non-linear amplifier is included, is initially positive rising from 0 dB to about 0.16 dB for about 17 channels (W' in the figure) and gradually reduces to about −0.20 dB for up to about 40 channels at 2 mW with 100 GHz spacing (X' in the figure). The inter-channel Raman tilt remains at about −0.2 dB when further channels are added with normal 50 GHz spacing at 1 mW (Y' and Z' in the figure). The gain characteristic of the amplifier is such that it has a tilt of −0.8 dB (gain decreasing with wavelength).

It is evident from a comparison of FIGS. 4 and 7 that the extreme residual tilt in the C-band when all of the available C-band channels are in use is reduced from 1 dB as shown in FIG. 4, representing conventional transmission, to −0.2 dB as shown in FIG. 7, a reduction of 0.8 dB, for non-linear amplification added to transmission in accordance with the invention.

The extreme residual tilts represented by FIGS. 4 and 7 apply to a link including a single length of optical signal transmission cable. An ultra-long haul arrangement may include in excess of 30 lengths, also called spans, of optical transmission cable, connecting associated transmitters and receivers. In the case of a long-haul arrangement with 30 spans, the resulting total reduction in extreme residual tilt is 24 dB when the result for a single span as represented by FIGS. 4 and 7 is applied.

The principal features of the method of transmission leading to the result shown in FIG. 7 include:

(i) Introducing channels of twice the normal power and twice the normal frequency separation for the first 40 channels which are selected from the odd-numbered channels, say, the result being that the total power in the fibre is equivalent to 80 conventional channels when 40 channels are brought into operation. Any additional channels from 40 to 80 (now including the even-numbered channels) do not have any further impact on the system tilt since the power in the fibre is not then altered.

(ii) Adding the first 40 channels in a contiguous manner, that is, the next channel added must be offset by twice the channel frequency spacing, for example, by 100 GHz for the 50 GHz (80 channel) system described.

(iii) Adding a fixed gain tilt through the erbium doped fibre amplifier (EDFA) serving to offset the system Raman tilt, thereby reducing extreme residual tilt which occurs at 40 channels and 80 channels.

The method has been described in relation to C-band transmissions but is equally applicable to L-band transmissions.

The invention claimed is:

1. A method of transmission by means of a transmission apparatus capable of transmitting a signal on a plurality of channels in a transmission band through optical transmission cable which exhibits a Raman effect of transferring power from shorter wavelength signals at one end of the transmission band towards longer wavelength signals at another end of the transmission band, comprising the steps of:

changing a number of the channels during transmission of the signal, when half or fewer channels of the plurality of channels available for use are to be used for transmitting the signal, transmitting the signal in nonadjacent channels spaced apart from each other at a wider frequency spacing and at a higher power level, when a number of channels to be used to transmit the signal is increased to more than half of the plurality of channels available for use such that a set of adjacent channels are used, transmitting the signal in the set of adjacent channels spaced apart from each other at a normal frequency spacing and at a normal power level, wherein the higher power level is higher than the normal power level, and wherein the wider frequency spacing is greater than the normal frequency spacing, decreasing the frequency spacing between the channels, and simultaneously decreasing the power level of the signal, as the number of the channels increases during transmission of the signal, and amplifying the signal non-uniformly after travel through the transmission cable, by amplifying the signal at the longer-wavelength other end of the transmission band less than the signal at the shorter-wavelength one end of the transmission band, to compensate for the Raman effect.

2. The method as claimed in claim 1, wherein the higher power level is twice the normal power level, and wherein the wider frequency spacing is twice the normal frequency spacing.

3. The method as claimed in claim 1, wherein when all the channels are to be used to transmit the signal, the method comprises transmitting all the channels at the normal power level.

4. The method as claimed in claim 1, wherein the step of amplifying the signal non-uniformly is performed in an erbium-doped-fiber amplifier (EDFA).

5. The method as claimed in claim 1, wherein the transmission band is the C-band of the electromagnetic spectrum.

6. The method as claimed in claim 1, wherein the transmission band is the L-band of the electromagnetic spectrum.

7. The method as claimed in claim 1, wherein the normal power level is 1 milliwatt.

8. An optical transmission apparatus, comprising:

a plurality of transmitters arranged to transmit a signal on a plurality of channels in a transmission band through an optical transmission cable which exhibits a Raman effect of transferring power from shorter wavelength signals at one end of the transmission band towards longer wavelength signals at another end of the transmission band, the transmission apparatus being arranged to control the transmitters to:

change a number of the channels during transmission of the signal, transmit the signal in nonadjacent channels spaced apart from each other at a wider frequency spacing and at a higher power level when half or fewer channels of the plurality of channels available for use are used for transmitting the signal, transmit the signal in the set of adjacent channels spaced apart from each other at a normal frequency spacing and at a normal power level when more than half of the plurality of channels available for use are used for transmitting the signal, wherein the higher power level is higher than the normal power level, wherein the wider frequency spacing is greater than the normal frequency spacing, decrease the frequency spacing between the channels, and simultaneously decrease the power level of the signal, as the number of the channels increases during transmission of the signal, and amplify the signal non-uniformly after travel through the transmission cable, by amplifying the signal at the longer-wavelength other end of the transmission band less than the signal at the shorter-wavelength one end of the transmission band, to compensate for the Raman effect.

* * * * *